(12) United States Patent
Wang et al.

(10) Patent No.: US 11,251,847 B2
(45) Date of Patent: Feb. 15, 2022

(54) USER DEVICE BEAMFORMING

(71) Applicant: Google LLC, Mountain View, CA (US)

(72) Inventors: Jibing Wang, Saratoga, CA (US); Erik Richard Stauffer, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 15/939,129

(22) Filed: Mar. 28, 2018

(65) Prior Publication Data

US 2019/0305835 A1 Oct. 3, 2019

(51) Int. Cl.
*H04B 7/06* (2006.01)
*H04W 76/27* (2018.01)
*H04W 72/04* (2009.01)
*H04L 5/00* (2006.01)

(52) U.S. Cl.
CPC ......... *H04B 7/0617* (2013.01); *H04L 5/0053* (2013.01); *H04W 72/0413* (2013.01); *H04W 76/27* (2018.02)

(58) Field of Classification Search
None
See application file for complete search history.

(56) References Cited

U.S. PATENT DOCUMENTS

| | | | |
|---|---|---|---|
| 5,543,811 A | 8/1996 | Chethik | |
| 6,711,224 B1 | 3/2004 | Benning et al. | |
| 8,315,185 B2 | 11/2012 | Chan | |
| 8,346,286 B2 | 1/2013 | Lee et al. | |
| 8,543,063 B2 | 9/2013 | Bergel et al. | |
| 8,594,053 B2 | 11/2013 | Kim et al. | |
| 8,605,644 B2 | 12/2013 | Wang | |
| 8,681,809 B2 | 3/2014 | Sambhwani et al. | |
| 8,774,150 B1 | 7/2014 | Jeffery et al. | |
| 8,923,192 B2 | 12/2014 | Gong | |
| 8,958,382 B2 | 2/2015 | Kim et al. | |
| 9,060,324 B1 | 6/2015 | Goyal et al. | |
| 9,124,395 B2 | 9/2015 | Lin et al. | |
| 9,204,441 B2 | 12/2015 | Nagaraja et al. | |
| 9,253,766 B2 | 2/2016 | Yang et al. | |

(Continued)

FOREIGN PATENT DOCUMENTS

| | | |
|---|---|---|
| CN | 106664127 | 5/2017 |
| EP | 3081041 | 10/2016 |

(Continued)

OTHER PUBLICATIONS

"International Search Report and Written Opinion", PCT Application No. PCT/US2019/017109, dated Mar. 28, 2019, 15 pages.

(Continued)

*Primary Examiner* — Lonnie V Sweet
(74) *Attorney, Agent, or Firm* — Colby Nipper PLLC (57) ABSTRACT

The present disclosure describes methods and apparatuses for forming beams that carry data transmitted from a user device to a base station. In some aspects, a transmission configuration is determined based on a set of beams downlinking the base station to the user device and carrying a set of data. The determined transmission configuration is the applied to a transceiver of the user device, which then transmits another set of data carried by another set beams uplinking the user device to the base station.

21 Claims, 7 Drawing Sheets

(56) References Cited

U.S. PATENT DOCUMENTS

| | | |
|---|---|---|
| 9,258,798 B2 | 2/2016 | Li et al. |
| 9,271,290 B2 | 2/2016 | Pelletier et al. |
| 9,332,456 B2 | 5/2016 | Heo et al. |
| 9,414,430 B2 | 8/2016 | Vajapeyam et al. |
| 9,425,923 B2 | 8/2016 | Ratasuk et al. |
| 9,648,637 B2 | 5/2017 | Yang et al. |
| 9,681,451 B1 | 6/2017 | Liu et al. |
| 9,686,667 B2 | 6/2017 | Artuso |
| 9,900,133 B2 | 2/2018 | Lu et al. |
| 10,080,244 B2 | 9/2018 | Lei et al. |
| 10,084,535 B1 | 9/2018 | Speidel et al. |
| 10,148,329 B2 | 12/2018 | Yue et al. |
| 10,218,422 B2 | 2/2019 | Raghavan et al. |
| 10,375,671 B2 | 8/2019 | Stauffer et al. |
| 10,512,008 B2 | 12/2019 | Deenoo et al. |
| 10,524,266 B2 | 12/2019 | Wang |
| 10,608,721 B2 | 3/2020 | Wang et al. |
| 10,700,769 B2 | 6/2020 | Wang et al. |
| 2005/0047322 A1 | 3/2005 | Sondur |
| 2006/0205346 A1 | 9/2006 | Evans et al. |
| 2008/0018427 A1 | 1/2008 | Ezra et al. |
| 2009/0102715 A1 | 4/2009 | Lou et al. |
| 2009/0116569 A1 | 5/2009 | Jin |
| 2009/0180451 A1 | 7/2009 | Alpert et al. |
| 2010/0194650 A1 | 8/2010 | Goransson et al. |
| 2010/0304680 A1 | 12/2010 | Kuffner et al. |
| 2011/0002373 A1 | 1/2011 | Jeon |
| 2011/0128866 A1 | 6/2011 | Tian et al. |
| 2011/0205981 A1 | 8/2011 | Koo et al. |
| 2012/0021322 A1 | 1/2012 | Brighton et al. |
| 2012/0027111 A1 | 2/2012 | Vook et al. |
| 2012/0039280 A1 | 2/2012 | Chen et al. |
| 2012/0140743 A1 | 6/2012 | Pelletier et al. |
| 2012/0208547 A1 | 8/2012 | Geirhofer et al. |
| 2012/0275384 A1 | 11/2012 | Long et al. |
| 2012/0295623 A1 | 11/2012 | Siomina et al. |
| 2013/0155975 A1 | 6/2013 | Dinan |
| 2013/0223251 A1 | 8/2013 | Li et al. |
| 2013/0286960 A1 | 10/2013 | Li et al. |
| 2013/0288667 A1 | 10/2013 | Tsui et al. |
| 2013/0301454 A1 | 11/2013 | Seol et al. |
| 2014/0146732 A1 | 5/2014 | Olufunmilo et al. |
| 2014/0148107 A1 | 5/2014 | Maltsev et al. |
| 2014/0211739 A1 | 7/2014 | Kim et al. |
| 2014/0213277 A1 | 7/2014 | Jang |
| 2014/0307693 A1 | 10/2014 | Feng et al. |
| 2014/0362752 A1 | 12/2014 | Jha et al. |
| 2014/0362811 A1 | 12/2014 | Lin et al. |
| 2015/0065133 A1 | 3/2015 | Cui et al. |
| 2015/0126239 A1 | 5/2015 | Kim et al. |
| 2015/0208458 A1 | 7/2015 | Pelletier et al. |
| 2015/0289147 A1 | 10/2015 | Lou et al. |
| 2015/0382205 A1 | 12/2015 | Lee et al. |
| 2016/0014664 A1 | 1/2016 | Singh et al. |
| 2016/0029235 A1 | 1/2016 | Kim et al. |
| 2016/0050002 A1 | 2/2016 | Wei et al. |
| 2016/0072564 A1 | 3/2016 | Li et al. |
| 2016/0099763 A1 | 4/2016 | Chen |
| 2016/0119846 A1 | 4/2016 | Chou et al. |
| 2016/0127997 A1 | 5/2016 | Ang et al. |
| 2016/0135213 A1 | 5/2016 | Zhu et al. |
| 2016/0157267 A1* | 6/2016 | Frenne ............... H04W 74/008 370/329 |
| 2016/0191132 A1 | 6/2016 | Rajogopal et al. |
| 2016/0205679 A1 | 7/2016 | Yoo et al. |
| 2016/0226640 A1 | 8/2016 | Seol et al. |
| 2016/0234736 A1 | 8/2016 | Kubota et al. |
| 2016/0242159 A1 | 8/2016 | Ho et al. |
| 2016/0270027 A1 | 9/2016 | Ang et al. |
| 2016/0277225 A1 | 9/2016 | Frenne et al. |
| 2016/0286524 A1 | 9/2016 | Griot et al. |
| 2016/0294531 A1 | 10/2016 | Loehr et al. |
| 2016/0345189 A1 | 11/2016 | Miyagawa et al. |
| 2016/0345234 A1 | 11/2016 | Yang et al. |
| 2016/0353424 A1 | 12/2016 | Stirling-Gllacher et al. |
| 2017/0026293 A1 | 1/2017 | Desclos et al. |
| 2017/0026962 A1 | 1/2017 | Liu et al. |
| 2017/0034812 A1 | 2/2017 | Deng et al. |
| 2017/0104561 A1 | 4/2017 | Agardh et al. |
| 2017/0134913 A1 | 5/2017 | Cui et al. |
| 2017/0142592 A1 | 5/2017 | Fischer et al. |
| 2017/0149480 A1 | 5/2017 | Kakishima et al. |
| 2017/0180095 A1 | 6/2017 | Xue et al. |
| 2017/0195031 A1 | 7/2017 | Onggonsanusi et al. |
| 2017/0201982 A1 | 7/2017 | Alvarino et al. |
| 2017/0208589 A1 | 7/2017 | Majjigi et al. |
| 2017/0223744 A1 | 8/2017 | Qian et al. |
| 2017/0237783 A1 | 8/2017 | Yang et al. |
| 2017/0244523 A1 | 8/2017 | Yang et al. |
| 2017/0257842 A1 | 9/2017 | Hessler et al. |
| 2017/0264350 A1 | 9/2017 | Sanderovich et al. |
| 2017/0295578 A1 | 10/2017 | Khoshnevisan et al. |
| 2017/0310417 A1 | 10/2017 | Jung et al. |
| 2017/0331577 A1 | 11/2017 | Parkvall et al. |
| 2017/0331670 A1 | 11/2017 | Parkvall et al. |
| 2017/0347334 A1 | 11/2017 | Akkarakaran et al. |
| 2017/0367046 A1 | 12/2017 | Papasakellariou |
| 2017/0367069 A1 | 12/2017 | Agiwal et al. |
| 2017/0374579 A1 | 12/2017 | Wang et al. |
| 2018/0014251 A1 | 1/2018 | Sambhwani et al. |
| 2018/0020462 A1 | 1/2018 | Xiong et al. |
| 2018/0027419 A1 | 1/2018 | Xu |
| 2018/0049177 A1 | 2/2018 | Islam et al. |
| 2018/0070282 A1 | 3/2018 | Su et al. |
| 2018/0077734 A1 | 3/2018 | Kim et al. |
| 2018/0103426 A1 | 4/2018 | Nacer et al. |
| 2018/0109353 A1 | 4/2018 | Kwak et al. |
| 2018/0110066 A1* | 4/2018 | Luo .................. H04W 72/0413 |
| 2018/0124612 A1 | 5/2018 | Babaei et al. |
| 2018/0139014 A1 | 5/2018 | Xiong et al. |
| 2018/0139615 A1 | 5/2018 | Cui et al. |
| 2018/0139701 A1 | 5/2018 | Wang et al. |
| 2018/0145732 A1 | 5/2018 | Shen et al. |
| 2018/0176955 A1 | 6/2018 | Salem et al. |
| 2018/0184422 A1 | 6/2018 | Cavalcanti et al. |
| 2018/0191415 A1 | 7/2018 | Aryafar et al. |
| 2018/0199306 A1 | 7/2018 | Stephen et al. |
| 2018/0205522 A1 | 7/2018 | Wang et al. |
| 2018/0206217 A1 | 7/2018 | Martin et al. |
| 2018/0206268 A1 | 7/2018 | Abdallah et al. |
| 2018/0213529 A1 | 7/2018 | Lee et al. |
| 2018/0227902 A1 | 8/2018 | Gholmieh et al. |
| 2018/0227960 A1 | 8/2018 | Belghoul et al. |
| 2018/0242160 A1 | 8/2018 | Morita et al. |
| 2018/0279303 A1 | 9/2018 | Sun et al. |
| 2018/0279324 A1 | 9/2018 | Wang et al. |
| 2018/0295552 A1 | 10/2018 | Chakraborty et al. |
| 2018/0332605 A1 | 11/2018 | Pelletier |
| 2018/0343043 A1 | 11/2018 | Hakola et al. |
| 2018/0367230 A1 | 12/2018 | Su et al. |
| 2019/0007844 A1 | 1/2019 | Müller et al. |
| 2019/0007963 A1* | 1/2019 | Akkarakaran .... H04W 72/0406 |
| 2019/0029005 A1 | 1/2019 | Bendlin et al. |
| 2019/0037495 A1 | 1/2019 | Wilson et al. |
| 2019/0037560 A1 | 1/2019 | Huang et al. |
| 2019/0037586 A1 | 1/2019 | Park et al. |
| 2019/0052419 A1 | 2/2019 | Yang et al. |
| 2019/0058516 A1 | 2/2019 | Yang et al. |
| 2019/0069321 A1 | 2/2019 | Akkarakaran et al. |
| 2019/0089436 A1 | 3/2019 | Wei et al. |
| 2019/0089443 A1* | 3/2019 | Malik ................ H04B 7/0404 |
| 2019/0089506 A1 | 3/2019 | Takeda et al. |
| 2019/0123798 A1 | 4/2019 | Lou et al. |
| 2019/0124664 A1 | 4/2019 | Wang |
| 2019/0132830 A1 | 5/2019 | Tabet et al. |
| 2019/0141767 A1 | 5/2019 | Wang et al. |
| 2019/0159140 A1 | 5/2019 | Wang et al. |
| 2019/0173626 A1 | 6/2019 | Wang et al. |
| 2019/0174433 A1 | 6/2019 | Nory et al. |
| 2019/0174497 A1 | 6/2019 | Wang et al. |
| 2019/0182850 A1 | 6/2019 | Wang et al. |
| 2019/0190577 A1 | 6/2019 | Wang et al. |
| 2019/0190591 A1 | 6/2019 | Wang et al. |
| 2019/0190641 A1 | 6/2019 | Wang et al. |

(56) References Cited

U.S. PATENT DOCUMENTS

| | | | |
|---|---|---|---|
| 2019/0190676 A1 | 6/2019 | Wang et al. | |
| 2019/0191440 A1 | 6/2019 | Wang et al. | |
| 2019/0200322 A1 | 6/2019 | Wang et al. | |
| 2019/0229789 A1 | 7/2019 | Zhang et al. | |
| 2019/0230603 A1 | 7/2019 | Liu et al. | |
| 2019/0230607 A1 | 7/2019 | Chung et al. | |
| 2019/0239168 A1 | 8/2019 | Li et al. | |
| 2019/0261281 A1* | 8/2019 | Jung | H04W 52/146 |
| 2019/0261380 A1 | 8/2019 | Iyer et al. | |
| 2019/0288809 A1 | 9/2019 | Iyer et al. | |
| 2019/0289476 A1* | 9/2019 | Chen | H04B 7/0695 |
| 2019/0306830 A1 | 10/2019 | Wang et al. | |
| 2019/0342825 A1 | 11/2019 | Liu | |
| 2019/0349968 A1 | 11/2019 | Yerramalli et al. | |
| 2019/0356368 A1 | 11/2019 | Liu et al. | |
| 2019/0373557 A1 | 12/2019 | Agardh et al. | |
| 2019/0380140 A1 | 12/2019 | Wong et al. | |
| 2020/0028745 A1 | 1/2020 | Parkvall et al. | |
| 2020/0052782 A1 | 2/2020 | Wang et al. | |
| 2020/0403658 A1 | 12/2020 | Wang et al. | |
| 2021/0021322 A1 | 1/2021 | Kuo et al. | |

FOREIGN PATENT DOCUMENTS

| | | |
|---|---|---|
| EP | 3105958 | 12/2016 |
| EP | 3123802 | 2/2017 |
| EP | 3443704 | 2/2019 |
| KR | 100860050 | 9/2008 |
| WO | WO-2013070149 | 5/2013 |
| WO | WO-2013179095 | 12/2013 |
| WO | WO-2015086215 | 6/2015 |
| WO | WO-2012074878 | 7/2015 |
| WO | WO-2016119882 | 8/2016 |
| WO | WO-2016133106 | 8/2016 |
| WO | WO-2016184277 | 11/2016 |
| WO | WO-2016204811 | 12/2016 |
| WO | WO-2017011802 | 1/2017 |
| WO | WO-2017025366 | 2/2017 |
| WO | WO-2017030601 | 2/2017 |
| WO | 2017083514 | 5/2017 |
| WO | WO-2017088898 | 6/2017 |
| WO | WO-2017109549 | 6/2017 |
| WO | WO-2017111987 | 6/2017 |
| WO | WO-2017117340 | 7/2017 |
| WO | WO-2017127126 | 7/2017 |
| WO | WO-2017146773 | 8/2017 |
| WO | WO-2017150863 | 9/2017 |
| WO | WO-2017195463 | 11/2017 |
| WO | WO-2017196243 | 11/2017 |
| WO | WO-2018028579 | 2/2018 |
| WO | WO-2018031846 | 2/2018 |
| WO | WO-2018034998 | 2/2018 |
| WO | WO-2018064068 | 4/2018 |
| WO | 2018083253 | 5/2018 |
| WO | WO-2018084757 | 5/2018 |
| WO | WO-2018130115 | 7/2018 |
| WO | WO-2019078938 | 4/2019 |
| WO | WO-2019094078 | 5/2019 |
| WO | WO-2019112648 | 6/2019 |
| WO | WO-2019118020 | 6/2019 |
| WO | WO-2019118021 | 6/2019 |
| WO | WO-2019118023 | 6/2019 |
| WO | WO-2019118787 | 6/2019 |
| WO | WO-2019118915 | 6/2019 |
| WO | WO-2019126791 | 6/2019 |
| WO | 2019190638 | 10/2019 |
| WO | WO-2019193768 | 10/2019 |
| WO | WO-2020055602 | 3/2020 |

OTHER PUBLICATIONS

"Written Opinion of the IPEA", PCT Application No. PCT/US2019/017109, dated Mar. 2, 2020, 6 pages.

"3rd Generation Partnership Project", Technical Specification Group Radio Access Network; NR and NG-RAN Overall; 3GPP Standard; Technical Specification; 3GPP TS 38.300, 3rd Generation Partnership Project (3GPP), Mobile Competence Centre, Nov. 17, 2017, 56 pages.

"3rd Generation Partnership Project; Technical Specification Group Radio Access Network", Evolved Universal Terrestrial Radio Access (E-UTRA) and NR; Multi-connectivity; Stage 2 (Release 15); 3GPP Standard; Technical Specification; 3GPP TS 37.340, 3rd Generation Partnership Project (3GPP), Mobile Competence Centre, Nov. 17, 2017, 49 pages.

"5G; Study on New Radio (NR) access technology (3GPP TR 38.912 version 14.0.0 Release 14)", ETSI TR 138 912 V14.0.0 (May 2017), May 2017, 77 pages.

"Dragonfly Narrowband IoT Unveiled with GNSS Option", GPS World Staff; Retrieved from http://gpsworld.com/dragonfly-narrowband-iot-unveiled-with-gnss-option/ on Dec. 7, 2017, Mar. 7, 2017, 5 pages.

"Evolved Universal Terrestrial Radio Access (E-UTRA)", 3rd Generation Partnership Project; Technical Specification Group Radio Access Network; Evolved Universal Terrestrial Radio Access (E-UTRA); Radio Resource Control (RRC); Protocol specification (Release 10), Mar. 2013, 307 pages.

"Final Office Action", U.S. Appl. No. 15/833,312, dated Oct. 7, 2019, 15 Pages.

"Final Office Action", U.S. Appl. No. 15/842,318, dated Jul. 10, 2019, 15 Pages.

"Final Office Action", U.S. Appl. No. 15/939,060, dated Nov. 29, 2019, 17 pages.

"First Action Interview Office Action", U.S. Appl. No. 15/842,318, dated May 7, 2019, 3 pages.

"First Action Interview Office Action", U.S. Appl. No. 15/844,093, dated Sep. 16, 2019, 4 Pages.

"First Action Interview Office Action", U.S. Appl. No. 16/142,952, dated Jan. 30, 2020, 6 Pages.

"Foreign Office Action", European Application No. 18830637.7, dated Jul. 7, 2020, 7 pages.

"International Preliminary Report on Patentability", PCT Application No. PCT/US2018/049407, dated Jun. 25, 2020, 12 pages.

"International Preliminary Report on Patentability", PCT Application No. PCT/US2018/043887, dated Jan. 22, 2020, 13 pages.

"International Preliminary Report on Patentability", PCT Application No. PCT/US2018/041696, dated Jun. 18, 2020, 14 pages.

"International Preliminary Report on Patentability", PCT Application No. PCT/US2019/017109, dated Jun. 23, 2020, 18 pages.

"International Preliminary Report on Patentability", PCT Application No. PCT/US2018/049403, dated Mar. 13, 2020, 20 pages.

"International Preliminary Report on Patentability", PCT Application No. PCT/US2018/065829, dated Jun. 25, 2020, 20 pages.

"International Preliminary Report on Patentability", PCT Application No. PCT/US2018/046004, dated Jan. 23, 2020, 21 pages.

"International Preliminary Report on Patentability", PCT Application No. PCT/US2018/067367, dated Mar. 17, 2020, 23 pages.

"International Preliminary Report on Patentability", PCT Application No. PCT/US2018/065557, dated Jun. 25, 2020, 29 pages.

"International Preliminary Report on Patentability", PCT Application No. PCT/US2018/050487, dated Jun. 25, 2020, 8 pages.

"International Search Report and Written Opinion", PCT Application No. PCT/US2018/046004, dated Nov. 22, 2018, 13 pages.

"International Search Report and Written Opinion", PCT Application No. PCT/2018/050487, dated Nov. 26, 2018, 13 pages.

"International Search Report and Written Opinion", PCT Application No. PCT/US2019/048811, dated Dec. 4, 2019, 15 pages.

"International Search Report and Written Opinion", PCT Application No. PCT/US2018/043887, dated Nov. 6, 2018, 17 pages.

"International Search Report and Written Opinion", PCT Application No. PCT/US2018/049407, dated Dec. 14, 2018, 18 pages.

"International Search Report and Written Opinion", PCT Application No. PCT/US2018/067367, dated Mar. 20, 2019, 19 pages.

"International Search Report and Written Opinion", PCT Application No. PCT/US2018/049403, dated Jan. 16, 2019, 21 pages.

"International Search Report and Written Opinion", PCT Application No. PCT/US2018/043887, dated Nov. 6, 2018, 21 pages.

(56) References Cited

OTHER PUBLICATIONS

"International Search Report and Written Opinion", PCT Application No. PCT/US2018/065829, dated Jun. 18, 2019, 28 pages.
"International Search Report and Written Opinion", PCT Application No. PCT/US2018/041696, dated Oct. 9, 2018, 30 pages.
"International Search Report and Written Opinion", PCT Application No. PCT/US2018/065557, dated Jun. 21, 2019, 38 pages.
"Invitation to Pay Additional Fees", PCT Application No. PCT/US2018/049403, dated Nov. 19, 2018, 13 pages.
"Invitation to Pay Additional Fees", PCT Application No. PCT/US2018/065829, dated Mar. 15, 2019, 13 pages.
"Invitation to Pay Additional Fees", PCT Application No. PCT/US2018/065557, dated Mar. 13, 2019, 19 pages.
"Leading the LTE IoT Evolution to Connect the Massive Internet of Things", Qualcomm, Inc., Jun. 2017, 41 pages.
"NB-IOT, Accelerating Cellular IOT", Huawei; Roads to MBB 2020; Building a Better Connected World; Global Mobile Broadband Forum 2015; Hong Kong, Nov. 2-5, 2015, 4 pages.
"Non-Final Office Action", U.S. Appl. No. 15/788,948, dated Nov. 29, 2018, 12 pages.
"Non-Final Office Action", U.S. Appl. No. 15/842,241, dated Mar. 11, 2019, 12 pages.
"Non-Final Office Action", U.S. Appl. No. 15/939,060, dated May 23, 2019, 15 pages.
"Non-Final Office Action", U.S. Appl. No. 15/833,312, dated Jun. 4, 2020, 17 Pages.
"Non-Final Office Action", U.S. Appl. No. 15/832,395, dated Feb. 27, 2019, 18 pages.
"Non-Final Office Action", U.S. Appl. No. 15/832,395, dated Aug. 30, 2019, 20 Pages.
"Non-Final Office Action", U.S. Appl. No. 16/126,920, dated Jan. 29, 2020, 21 Pages.
"Non-Final Office Action", U.S. Appl. No. 16/105,948, dated Mar. 27, 2020, 21 Pages.
"Non-Final Office Action", U.S. Appl. No. 15/852,572, dated Sep. 14, 2018, 6 pages.
"Non-Final Office Action", U.S. Appl. No. 16/446,416, dated Oct. 18, 2019, 7 Pages.
"Notice of Allowance", U.S. Appl. No. 15/844,093, dated Mar. 2, 2020, 10 Pages.
"Notice of Allowance", U.S. Appl. No. 15/844,093, dated May 13, 2020, 11 Pages.
"Notice of Allowance", U.S. Appl. No. 15/842,241, dated Dec. 5, 2019, 5 Pages.
"Notice of Allowance", U.S. Appl. No. 15/852,572, dated Mar. 11, 2019, 5 pages.
"Notice of Allowance", U.S. Appl. No. 15/842,241, dated Aug. 5, 2019, 6 pages.
"Notice of Allowance", U.S. Appl. No. 16/126,920, 8 Pages.
"Notice of Allowance", U.S. Appl. No. 15/788,948, dated Jul. 12, 2019, 8 Pages.
"Notice of Allowance", U.S. Appl. No. 15/788,948, dated Oct. 21, 2019, 8 Pages.
"Notice of Allowance", U.S. Appl. No. 16/142,952, dated Feb. 28, 2020, 9 Pages.
"Pre-Interview Communication", U.S. Appl. No. 15/842,318, dated Mar. 29, 2019, 4 pages.
"Pre-Interview Communication", U.S. Appl. No. 15/833,312, dated Apr. 19, 2019, 4 pages.
"Pre-Interview Communication", U.S. Appl. No. 16/142,952, dated Dec. 20, 2019, 5 Pages.
"Pre-Interview Communication", U.S. Appl. No. 15/844,093, dated Jun. 28, 2019, 5 pages.
"Procedures Associated with Access and Operation of Uplink Common Packet Channel and the Associated Downlink Dedicated Control Channel", TSG-RAN WG 1#4 TSGR1#4(99) 371, Apr. 19-20, 1999, Yokohama, Japan, Apr. 1999, 10 pages.
"Progress on LAA and its Relationship to LTE-U and MulteFire", Qualcomm Presentation, Feb. 22, 2016, 2016, 33 pages.
"Restriction Requirement", U.S. Appl. No. 15/842,318, dated Oct. 4, 2018, 7 pages.
"Restriction Requirement", U.S. Appl. No. 15/852,572, dated Jun. 11, 2018, 9 pages.
"Tracking mm-Wave Channel Dynamics: Fast Beam Training Strategies Under Mobility", IMDEA Networks Institute, Madrid, Spain, Dec. 23, 2016, 11 pages.
"UE Overheating for EN-DC", 3GPP R2-1802414, UE overheating for EN-DC, in 3GPP TSG-RAN WG2 Meeting #101, Apple Inc., Mar. 2, 2018, 3 pages.
"Written Opinion", PCT Application No. PCT/US2018/065557, dated Nov. 15, 2019, 4 pages.
"Written Opinion of the International Preliminary Examining Authority", PCT Application No. PCT/US2018/065557, dated Feb. 4, 2020, 13 pages.
"Written Opinion of the International Preliminary Examining Authority", PCT Application No. PCT/US2018/049407, dated Oct. 21, 2019, 8 pages.
"Written Opinion of the International Preliminary Examining Authority", PCT Application No. PCT/US2018/049403, dated Oct. 25, 2019, 8 pages.
"Written Opinion of the International Preliminary Examining Authority", PCT Application No. PCT/US2018/043887, dated Sep. 30, 2019, 9 pages.
"Written Opinion of the International Searching Authority", PCT Application No. PCT/US2018/046004, dated Oct. 21, 2019, 6 pages.
Dutta, Sourja et al., "Frame Structure Design and Analysis for Millimeter Wave Cellular Systems", avix.org; NYU Wireless, New York University Tandon School of Engineering, Aug. 20, 2016, 31 pages.
Gineste, Mathieu et al., "Narrowband IoT Service Provision to 5G User Equipment Via A Satellite Component", 2017 IEEE Globecom Workshops, IEEE, Dec. 4, 2017, Dec. 4, 2017, 4 pages.
Guidotti, Alessandro et al., "LTE-Based Satellite Communications in LEO Mega-Constellations", 2017 John Wiley & Sons, Ltd., 2017, 17 pages.
Jantti, Riku "Machine Type Communications for Internet of Things—Recent advances and future possibilities", WNCG; Seminar, Oct. 7, 2016, 1 page.
Landstrom, Sara et al., "NB-IOT: A Sustainable Technology for Connecting Billions of Devices", Ericsson Technology Review; Standardizing Narrowband IoT, Apr. 22, 2016, 12 pages.
O'Hara, Kenneth M. et al., "Providing Narrowband IoT Coverage with Low Earth Orbit Satellites", 2019 Horizon House Publications, Inc., 2019, 4 pages.
Pederson, Klaus I. et al., "A Flexible Frame Structure for 5G Wide Area", Aalborg University, Proceedings of IEEE VTC Fall—2015, 2015, 6 pages.
Thales, et al., "FS_5GSAT, Draft Use Case, Internet of Things with a Satellite Component", 3GPP TSG-SA WG1 Meeting #80 S1-174441 Reno, Nevada, USA, Nov. 27-Dec. 1, 2017, 2017, 2 pages.
USPTO, "Final Office Action", U.S. Appl. No. 15/832,395, dated Apr. 2, 2020, 23 Pages.
Wu, Chih-Hsiang "Handling Overheating in a Wireless-Communication Device", Technical Disclosure Commons; Retrieved from https://www.tdcommons.org/dpubs_series/2343, Jul. 12, 2019, 22 pages.
Xiao, Jie et al., "An Adaptive Channel Access Mechanism for LTE-U and WiFi Coexistence in an Unlicensed Spectrum", IEEE ICC 2016—Next-Generation Networking and Internet Symposium, 2016, 6 pages.
"Corrected Notice of Allowance", U.S. Appl. No. 15/844,093, dated Dec. 9, 2020, 3 pages.
"Non-Final Office Action", U.S. Appl. No. 15/844,093, dated Jan. 4, 2021, 12 pages.
"Notice of Allowance", U.S. Appl. No. 15/844,093, dated Sep. 16, 2020, 10 Pages.
"International Preliminary Report on Patentability", Application No. PCT/US2019/048811, dated Mar. 9, 2021, 8 page.
"Non-Final Office Action", U.S. Appl. No. 16/963,426, dated Apr. 1, 2021, 18 pages.

(56) References Cited

OTHER PUBLICATIONS

"Foreign Office Action", CN Application No. 201880070673.0, dated Aug. 27, 2021, 26 pages.
"Notice of Allowance", U.S. Appl. No. 15/844,093, dated Aug. 13, 2021, 16 pages.
"Notice of Allowance", U.S. Appl. No. 16/963,426, dated Oct. 5, 2021, 13 pages.

* cited by examiner

702
Transmit, via a transceiver of a base station, first layers of data carried by corresponding beams of a first set of beams, the first layers of data associated with Physical Downlink Control Channel (PDCCH) communications

704
Receive, via the transceiver of the base station, second layers of data carried by corresponding beams of a second set of beams, the second layers of data associated with Physical Uplink Shared Channel (PUSCH) communications and the second set of beams formed based on an analysis of the first set of beams

FIG. 7

USER DEVICE BEAMFORMING

BACKGROUND

Wireless communications from user devices rely on a wireless connection between each user device and a network node, such as a base station of a wireless network provider. With advances in wireless standards and a demand for increased bandwidth for transmitting and receiving data, wireless network providers are transitioning toward beamforming techniques. These beamforming techniques increase the quantity of devices communicating with the base station and increase ranges over which user devices communicate with the base station.

An antenna array can constructively, or destructively, combine signals originating from antennas of the antenna array to change a path of a beam originating from the antenna array as well as increase a strength of a signal transmitted along the path. This can improve performance of a wireless network by improving ranges of communication resulting from increases in signal strengths and by reducing likelihood of interference from other beams.

Today, it is common for a base station of a wireless network to form a set of beams for data transmitted from the base station as part of downlink communications to a user device. The user device is typically agnostic to this set of beams and may transmit data using a different set as part of uplink communications to the base station, where the user device's different set of beams may compromise performance of the wireless network. For example, the different set of beams may not possess signal strengths to successfully communicate and may interfere with other sets of beams transmitted from the base station to other user devices. In cases where a user device transmits layers of data using a set of beams formed in accordance with a transmission configuration that impacts beam directions and signal strengths, the configuration may be outdated or non-applicable to an environment current to the user device and the base station. Additionally, if a base station hands off communication to another base station as the user device changes its physical location, such problems may multiply.

SUMMARY

This document describes methods and apparatuses for forming beams that carry data uplinked from a user device to a base station. A transmission configuration for the beam is determined based on a set of beams downlinking the base station to the user device and carrying layers of data. The determined transmission configuration is then applied to a transceiver of the user device, which transmits another layer of data carried by another set of beams formed in accordance with the determined transmission configuration and uplinking the user device to the base station.

In other aspects, a base station transmits layers of data carried by a set of beams that downlinks the base station to the user device. The base station then receives another layer of data carried by another set of beams that uplinks the user device to the base station and formed in accordance with a determination made by the user device based on the set of beams that downlinks the base station to the user device.

In yet other aspects, a user device is comprised of a processor, a transceiver, and instructions stored on a computer-readable media that, responsive to execution by the processor, cause the user device to determine a transmission configuration, configure the transceiver to the determined transmission configuration, and transmit data on beams formed in accordance with the determined transmission configuration.

The details of one or more implementations are set forth in the accompanying drawings and the following description. Other features and advantages will be apparent from the description and drawings, and from the claims. This document provides the summary to introduce subject matter that the Detailed Description and Drawings further describe. Accordingly, a reader of this summary should not consider the summary to describe essential features nor use the summary to limit the scope of the claimed subject matter.

BRIEF DESCRIPTION OF THE DRAWINGS

This document describes details of one or more aspects of user device beamforming. The use of the same reference numbers in different instances in the description and the figures may indicate like elements.

DETAILED DESCRIPTION

Generally, a user device communicates with a wireless network through a base station. To improve its signal range, a user device configures multiple antennas that are part of its transceiver to form beams. With beamforming, a transceiver of a user device may weight and route signals through antennas of a Multiple-Input and Multiple-Output (MIMO) antenna array of the user device. This weighting and routing changes the strength and beam direction of the signals to form a beam as the transceiver transmits the signals. Beamforming can be particularly beneficial for wireless networks operating at high frequencies, as such operations are susceptible to propagation loss due to the high frequencies of the signals.

To determine an appropriate strength and path of an outgoing beam, a beam analysis module of the user device analyzes characteristics associated with receiving an incoming beam. Such characteristics may include signal strengths or signal frequencies associated with the incoming beam, timing of receipt of data associated with the incoming beam, or antennas (e.g., of a MIMO antenna array) receiving data associated with the incoming beam. As part of the incoming beam analysis, an algorithm of the beam analysis module may analyze the characteristics associated with receiving the incoming beam and determine a transmission configuration. The determined transmission configuration, implemented by a transceiver configuration module that configures the transceiver, may be a configuration such that a transmitted outgoing beam "matches" the incoming beam in a reciprocal fashion (e.g., beam direction or signal strength). Alternatively, the determined transmission configuration may be determined with an intent to improve overall performance of a wireless network and yield an outgoing beam that does not match the incoming beam.

With technologies such as $5^{th}$ generation network radio (5G NR) technology, downlink communications from a base station to a user device may initiate using resources of Physical Downlink Control Channel (PDCCH), including sub-channels and resource elements of one or more resource blocks. A set of beams may carry layers of data over the PDCCH, including a layer of data having Downlink Control Information (DCI) or a layer of data that grants the user device access to resources (e.g., resource blocks) of a Physical Uplink Shared Channel (PUSCH). In turn, uplink communications from the user device may use the granted resource blocks and another set of beams to carry other layers of data over the PUSCH channel to the base station. The other layers of data may include, for example, Radio Resource Control (RRC) data, Uplink Control Information (UCI) data, or data from an application executing on the user device.

This document describes techniques and systems for user device beamforming. These techniques may include a user device receiving layers of data over a PDCCH channel of a 5G NR wireless network and determining a transceiver configuration based on an analysis of beams carrying the layers of data. After configuring the transceiver to the determined transceiver configuration, the user device transmits other layers of data over a PUSCH channel of the 5G NR wireless network where other beams, formed in accordance with the transceiver configuration, carry the other layers of data.

The following discussion describes examples of an operating environment, devices implemented in a networking environment, and techniques employed in the operating environment and/or network environment. In the present context, this document references the operating environment or networking environment by way of example only.

Operating Environment

Figure 1:
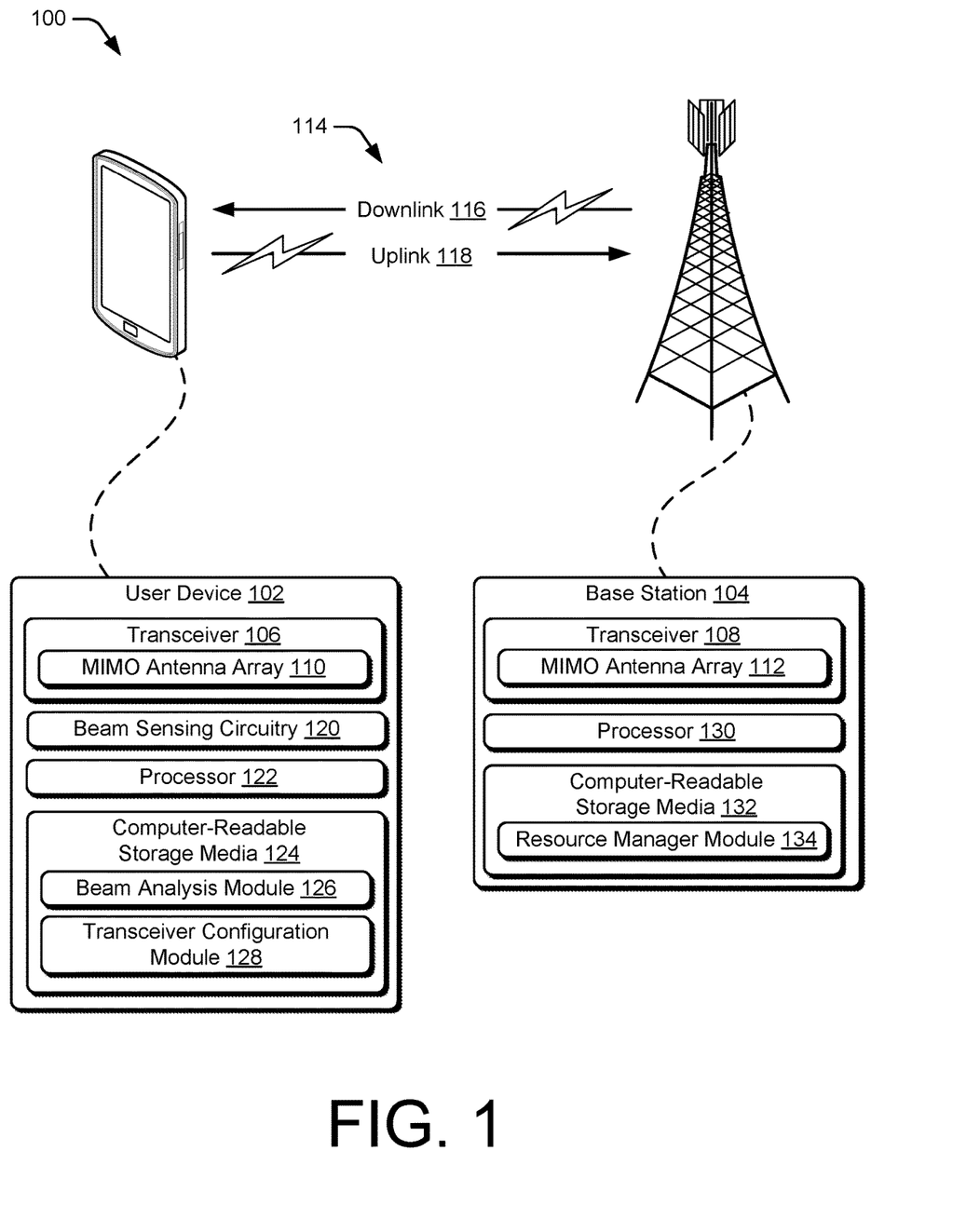
FIG. 1 illustrates an example operating environment in which a user device performs beamforming operations as part of uplink communications to a base station.

FIG. 1 illustrates an example operating environment 100 in which a user device performs beamforming operations as part of uplink communications to a base station. In this example, the operating environment includes a user device 102 and a base station 104, each having a respective transceiver (106 and 108, respectively) including a respective Multiple-Input and Multiple-Output (MIMO) antenna array (110 and 112, respectively). Generally, a wireless connection 114 between the user device 102 and the base station 104 includes a downlink 116 by which the user device 102 receives data or information using the transceiver 106 having the MIMO antenna array 110 from the base station 104. The wireless connection 114 also includes an uplink 118 by which the user device 102 transmits data or information using the transceiver 108 having the MIMO antenna array 112 to the base station 104. The wireless connection 114 conforms with a suitable protocol or standard, such as a Global System for Mobile Communications (GSM), Worldwide Interoperability for Microwave Access (WiMax), a High Speed Packet Access (HSPA), Evolved HSPA (HSPA+) protocol, an LTE protocol (e.g., 4G), an LTE Advanced protocol, or a 5G NR protocol. The wireless connection 114 between the user device 102 and the base station 104 may also be referred to as a wireless association, a frame exchange, a wireless link, or a communication link.

As part of the user device 102, hardware in the form of beam sensing circuitry 120 may sense signals of beams for signal strength.

The user device 102 also includes a processor 122 and computer-readable storage media (CRM) 124 storing modules of code or executable instructions in the form of a beam analysis module 126 and a transceiver configuration module 128. Although FIG. 1 depicts the user device 102 as a smailphone, the user device 102 may instead be a device with wireless communication capabilities, such as a mobile gaming console, a tablet, a laptop, an advanced driver assistance system (ADAS), handset, a communication system of an automobile, a point-of-sale (POS) terminal, a health monitoring device, a drone, a camera, a media-streaming dongle, a wearable smart-device, an internet-of-things (IoT) device, a personal digital assistant, a navigation device, a mobile-internet device (MID), a wireless hotspot, a femtocell, or a broadband router.

The processor 122 of the user device 102 can execute modules of instructions or code stored by the computer-readable storage media (CRM) 122 to cause the user device 102 to perform operations or implement various device functionalities. In some cases, the processor 122 is an application processor (e.g., multicore processor) or a system-on-chip with other components of the user device integrated therein. The CRM 124 may include a suitable type of memory media or storage media, such as read-only memory (ROM), programmable ROM (PROM), random access memory (RAM), static RAM (SRAM), or Flash memory. In the context of this discussion, the CRM 124 of the user device 102 is a hardware-based storage media, which does not include transitory signals or carrier waves. In some cases, the CRM 124 stores one or more of firmware, an operating system, or applications of the user device 102 as modules of instructions, code, or information. The processor 122 executes the modules of instructions or code to implement various functionalities of the user device 102. In this example, the CRM 124 includes storing modules of instructions or code for beam analysis or transceiver configuration.

In some aspects, the beam analysis module 126 implements an algorithm to analyze characteristics associated with receiving an incoming beam carrying a layer of data. Such characteristics may include beam direction, signal strength, and frequency of the incoming beam as received by the MIMO antenna array 110 and sensed by the beam sensing circuitry 120. The incoming beam may be a part of the downlink 116 between the base station 104 and the user device 102 and originate from the transceiver 108 having the MIMO antenna array 112. By analyzing the characteristics associated with receiving the incoming beam, the beam analysis module 126 may determine a transmission configuration to form an outgoing beam (carrying another layer of data) in terms of beam direction or signal strength.

In one example instance, the user device 102 configures the transceiver 106 such that the MIMO antenna array 112 performs as a phased array. In such an instance, the transceiver 106 forms an outgoing beam along a pre-defined beam direction. In another example instance, the user device 102 configures the transceiver 106 such that the MIMO antenna array performs as an adaptive array. In such an instance, the transceiver 106 forms an outgoing beam along one of a number of available beam directions and can make adjustments in real time.

In addition to the transceiver 108 having the MIMO antenna array 112, the base station 104 includes a processor 130 and a computer-readable storage media (CRM) 132 having modules of code or executable instructions in the form of a resource manager module 134 for managing communication resources available to the wireless network. Examples of such communication resources include Resource Blocks (RBs), comprised of frequency bands and time locations of resource elements. The resource manager module 134 may schedule and allocate frequency bands and time locations of resource elements to the user device 102 for communications over the uplink 118, which may include of one or more outgoing beams.

As part of communicating to the user device 102, the base station 104 forms beams for the downlink 116. In such instances, hardware determining a configuration for the transceiver 108 having the MIMO antenna array 112 can be local to the base station 104 or remote from the base station 104.

Figure 2:
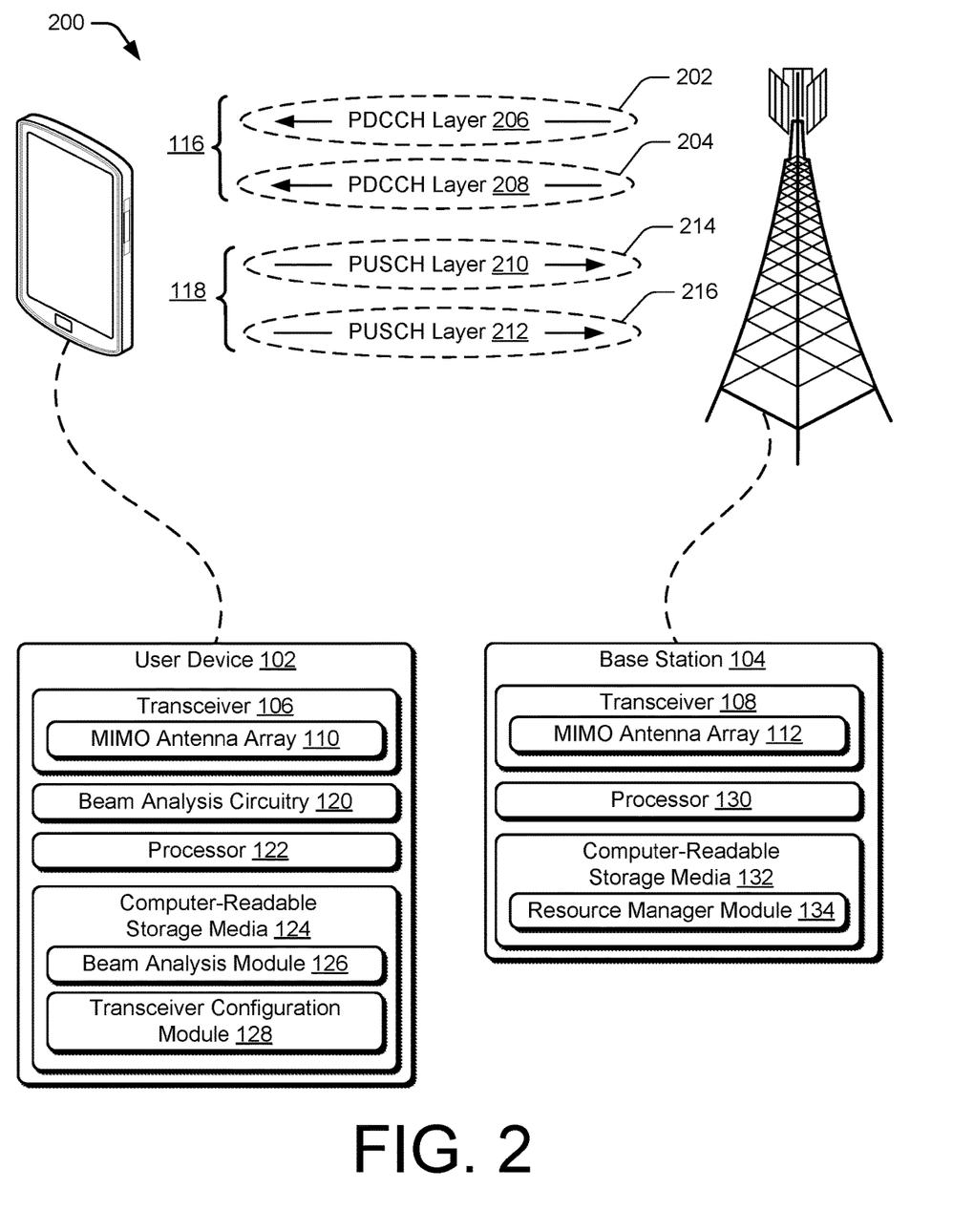
FIG. 2 illustrates an example detailed setting in which the user device and base station communicate in accordance with one or more aspects of user device beamforming.

FIG. 2 illustrates an example, detailed setting 200 in which the user device and base station communicate in accordance with one or more aspects of user device beamforming. The detailed setting 200 occurs within the operating environment of FIG. 1.

Downlink 116 is comprised of multiple beams, including beam 202 and beam 204. Using communication resources in the form of frequency bands and time locations of resource elements as allocated by the resource manager module 134, the beam 202 carries a first layer of data, Physical Downlink Control Channel (PDCCH) layer 206, while beam 204 carries a second layer of data, Physical Downlink Control Channel (PDCCH) layer 208. In one example, the PDCCH layer 206 may include a first portion of data and the PDCCH layer 208 may include a second portion of data that, in combination, grant the user device 102 access to Physical Uplink Shared Channel (PUSCH) uplink communications. In another example, the PDCCH layer 206 and the PDCCH layer 208 may include duplicate data granting PUSCH uplink access to the user device 102 for redundancy and reliability purposes. In either example, the PUSCH uplink grant has the same number of layers as the transmitted layers of data.

The user device 102 receives the PDCCH layer 206 and the PDCHH layer 208 via the transceiver 106. Upon receipt of the PDCCH layer 206 and the PDCCH layer 208, the processor 122 executes the code or instructions of the beam analysis module 126 and implements an algorithm to analyze characteristics of the beams 202 and 204, determining a transmission configuration for the transceiver 106. The processor then executes the code or instructions of the transceiver configuration module 128 to configure the transceiver 106.

The user device 102 can then transmit new layers of data, such as the PUSCH layer 210 and the PUSCH layer 212. In accordance with the configuration of the transceiver 106, the beam 214 carries data associated with the PUSCH layer 210 and the beam 216 carries data associated with the PUSCH layer 212. The PUSCH layers 210 and 212 may include data related to Radio Resource Control (RRC) data, Uplink Control Information (UCI) data, or data associated with an application executing on the user device 102.

The beams 214 and 216 may carry duplicate data, segmented data, or combinations thereof. Furthermore, the beams 214 and 216 may share frequency bands and time locations of resource elements as allocated to the user device 102 by the resource manager module 134. When sharing frequency bands and time locations, the beam analysis module 126 may determine a transmission configuration that, when applied to the transceiver 106, results in the beam 214 and the beam 216 having different beam directions and/or transmission time offsets, which the base station 104 may reconcile when receiving the PUSCH layer 210 and the PUSCH layer 212 via the transceiver 108.

FIG. 2 illustrates downlink and uplink communications each comprised of two beams carrying a corresponding layer of data. The user device can scale techniques beyond the illustrated two beams to apply to multiple (more than two) beams carrying corresponding layers of data.

Figure 3:
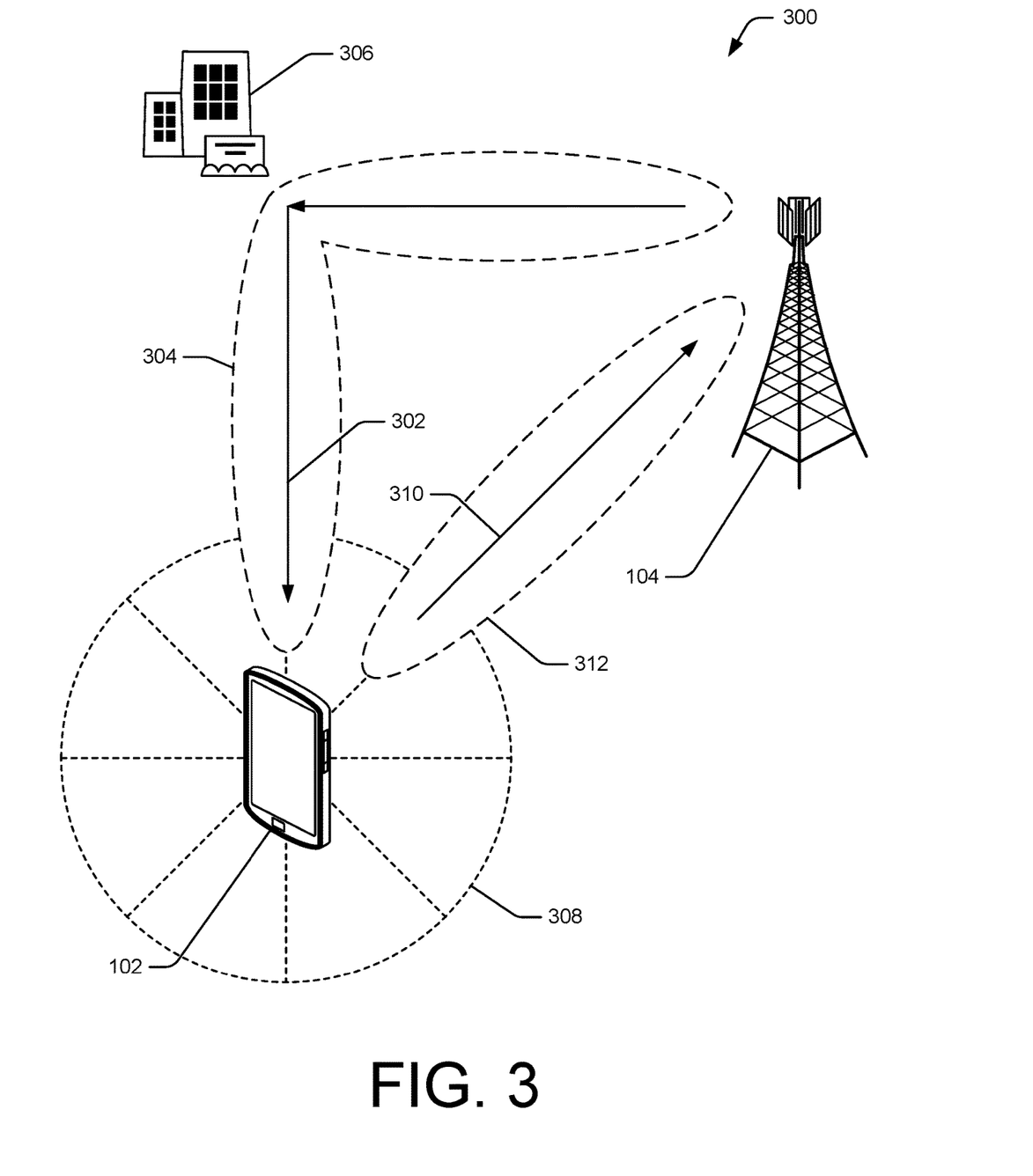
FIG. 3 illustrates an example detailed setting in which a user device forms a beam along a beam direction.

FIG. 3 illustrates an example detailed setting 300 in which a user device forms a beam along a beam direction within the operating environment of FIG. 1. In the detailed setting 300, the user device 102 is receiving a first layer of data 302 transmitted from the base station 104. As part of detailed setting 300, a beam 304 is carrying the first layer of data 302. Also, as part of detailed setting 300, an obstacle 306 reflects the beam 304.

As part of detailed setting 300, the user device 102 (e.g., the algorithm of the beam analysis module 126) analyzes the beam 304 and determines a beam direction traversed by the beam 304. For example, the user device 102 can analyze a latency profile of a signal of the beam 304 as received across antennas of an antenna array (e.g., the MIMO antenna array 110) to establish the beam direction traversed by the beam 304. The latency profile, in this instance, indicates different times that different, respective antennas of the MIMO antenna array 110 receive the signal. Using a combination of known geometric relationships that can include spacing of the antennas, identities of the antennas, or orientation of the user device, the beam analysis module 126 analyzes the latency profile to determine the beam direction traversed by the beam 304.

As another example, the user device 102 can analyze signal strengths of the signal of the beam 304 as received across antennas of the MIMO antenna array 110. In this instance, the MIMO antenna array 110 may not be planar, resulting in one or more antennas of the MIMO antenna array 110 being shielded from receiving a signal. In this instance, the beam analysis module 126 can analyze signal strengths sensed by beam sensing circuitry 120 and determine the beam direction traversed by the beam 304, attributing the beam direction to be normal to one or more antennas receiving signals of the strongest strengths.

Continuing with the analysis, the user device 102 evaluates a group of beam directions 308 available for transmitting layers of data from the user device 102. Completing the analysis, the user device 102 then determines a transmission configuration for transmitting a second layer of data 310 directly to the base station 104 via a beam 312 that carries the second layer of data 310 along a second beam direction that is different than that of the beam 304.

Determining the transmission configuration may include identifying antennas of the MIMO antenna array 110, for transmitting the second layer of data 310, to work in accordance with constructive signal interference and destructive signal interference principles to form the beam 312. This can include phase shifting and weighting of signals across the identified antennas of the MIMO antenna array 110 to directionally form the beam 312.

After configuring its transceiver (e.g., the transceiver configuration module 128 configuring the transceiver 106), the user device 102 transmits the second layer of data 310 in accordance with the transmission configuration, forming the beam 312 that carries the second layer of data 310 to the base station 104 in an unimpeded fashion.

As part of the beam analysis, the algorithm that is part of the beam analysis module 126 may, in addition to characteristics such as signal strength and beam direction, take into account additional factors when determining a transmission configuration used for forming beams. Such additional factors may include frequencies of received beams, traffic patterns of a wireless network (current or projected), volumes of data that multiple device are communicating within the wireless network, location of the user device 102 in relation to the base station 104, a time of day, reliability or uptime of the base station 104, or the like.

FIG. 3 illustrates downlink communications and uplink communications where the user device forms an uplink beam along a beam direction that is different than that of a downlink beam. A user device can also, as part of managing one or more beams, form an uplink beam along a beam direction that is reciprocal (e.g., opposite) to that of a downlink beam.

Figure 4:
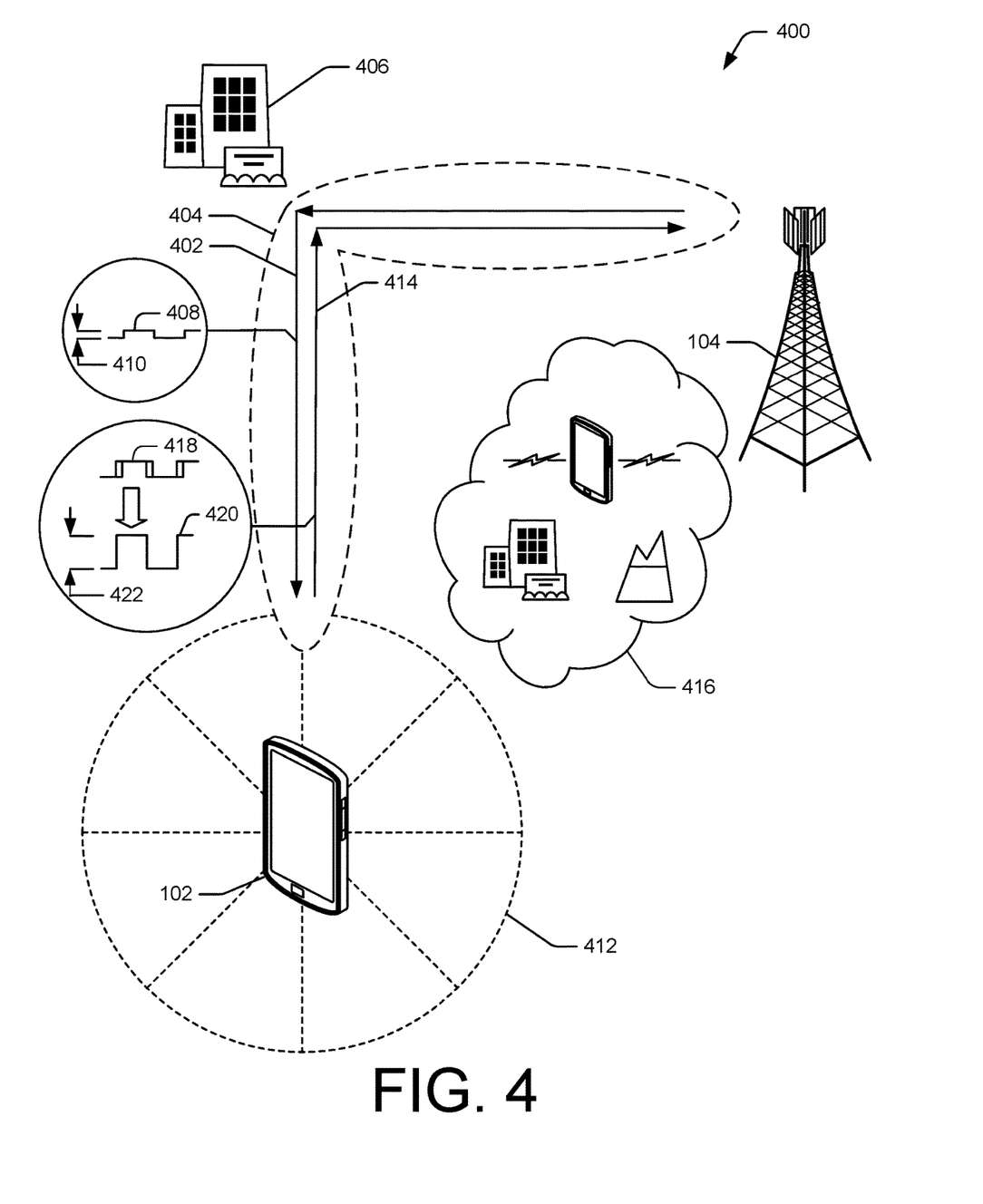
FIG. 4 illustrates an example detailed setting in which a user device increases a signal strength as part of forming a beam.

FIG. 4 illustrates an example detailed setting 400 in which a user device increases a signal strength as part of forming a beam within the operating environment of FIG. 1. In the detailed setting 400, the user device 102 is receiving a first layer of data 402 transmitted from the base station 104. As part of the detailed setting 400, a beam 404 is carrying the first layer of data 402. Also, as part of the detailed setting 400, an obstacle 406 absorbs energy and reflects the beam 404 along a beam direction.

As part of detailed setting 400, the user device 102 (e.g., the beam analysis module 126) analyzes the beam 404. The analysis ascertains that at least one signal 408 (as received by an antenna of the MIMO antenna array 110 and sensed by beam sensing circuitry 120) has a signal strength 410 (e.g., an amplitude measured in decibels (dB)) that is below a predetermined threshold due to signal losses associated with the beam direction traversed by the beam 404.

In the detailed setting 400, the user device 102 may evaluate a group of beam directions 412 available for beams carrying a second layer of data 414 from the user device 102. The user device 102 searches for a direct beam direction for a beam to uplink the user device 102 to the base station 104 and avoid signal losses. However, the user device 102 may establish that a region along a direct beam direction between the user device 102 and the base station 104 contains obstacles that would impede a beam carrying a layer data. As an example, a region 416, along a direct beam direction between the user device 102 and the base station 104, could include one or more buildings, mountains, or other devices communicating, which could impede a beam by reflecting the beam, absorbing energy of the beam, or providing destructive signal interferences. As part of ascertaining that the region 416 contains obstacles, the user device 102 may rely on factors such as Global Positioning System (GPS) coordinates of the user device 102, detecting beams from other devices communicating in the region 416, a time of day typically having high communication traffic, or stored data indicating a population density of the region 416.

The user device 102 then determines that a beam direction that is reciprocal to the beam 404 is a best option along which to form a beam carrying the second layer of data 414. However, to overcome predicted signal losses associated with forming a beam along a beam direction that is reciprocal to that of beam 404, the user device 102 determines that transmission signal strengths need to be increased.

To increase transmission signal strengths, the user device 102 may, in one instance, simply weight signals originating from antennas of the MIMO antenna array 110 that correspond to a beam direction that is reciprocal to that of the beam 404. In another instance, however, the user device 102 may form a beam by generating multiple signals 418 of a nominal signal strength from different antennas (e.g., of the MIMO antenna array 110) and introduce a phase-offset between the multiple signals 418. The generation of the multiple signals 418 in this manner is effective to, through constructive interference principles, create a signal 420 having a signal strength 422 that is greater than the nominal signal strength of each of the multiple signals 418. The user device 102 then transmits, along a beam direction that is reciprocal to the beam direction of the beam 404, the second layer of data 414 carried by a beam using the signal 420 (e.g., the combination of the multiple signals 418).

In addition to increasing the strength of the signal 420 to the signal strength 422 using constructive signal interference, the user device 102 may use additional constructive signal and destructive signal interferences to directionally form an outgoing beam. In the current example, additional phase shifting and weighting of signals across antennas of the MIMO antenna array 110 results in a beam traversing along a beam direction that is reciprocal to that of 404 and having signal the signal strength 422.

Figure 5:
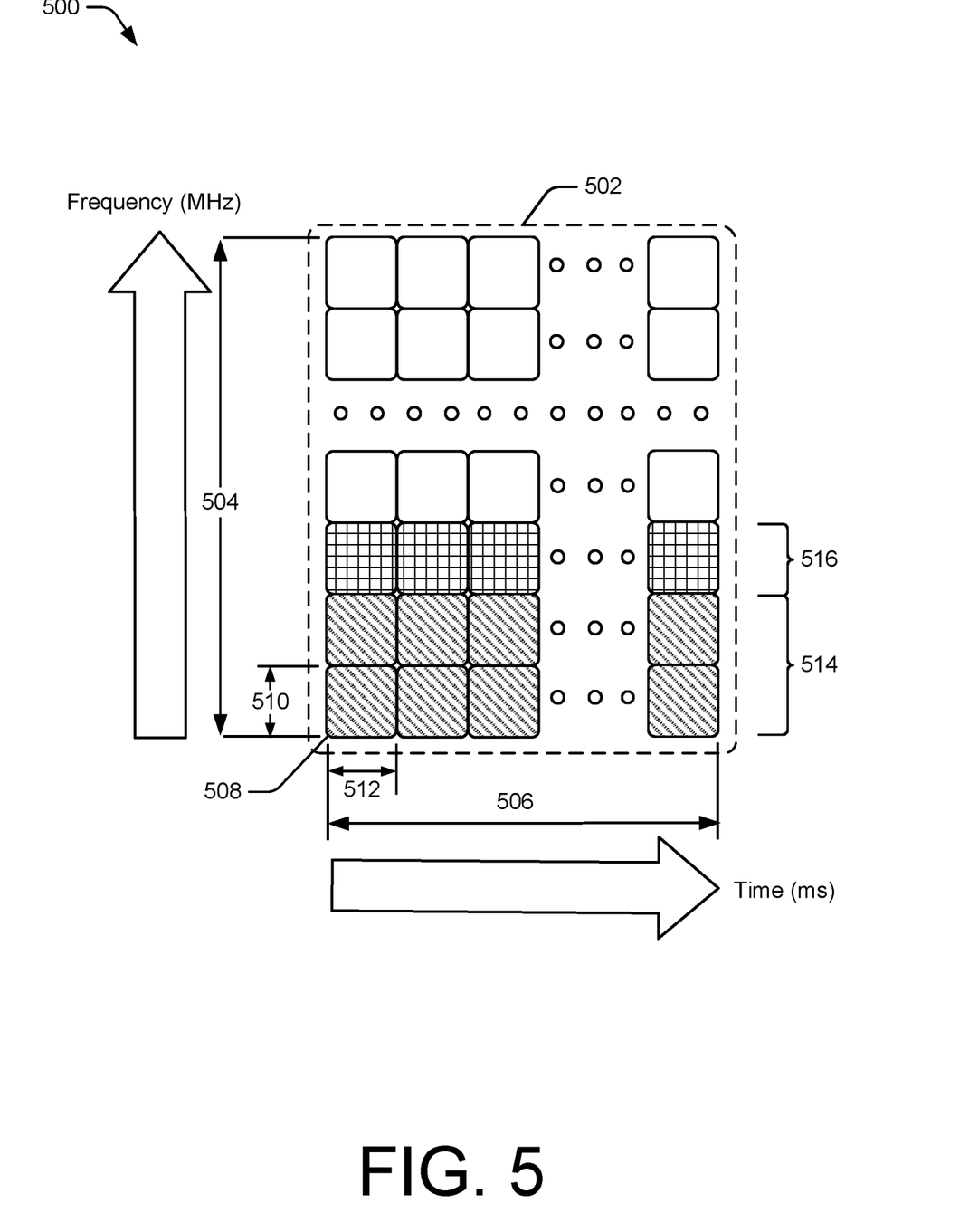
FIG. 5 illustrates an example configuration of a resource block available to a wireless network.

FIG. 5 illustrates an example configuration 500 of a resource block 502 available to a wireless network. The configuration 500 occurs within the operating environment of FIG. 1.

The resource block 502 spans a frequency range 504 and a time range 506. Each resource element 508 of resource block 502, as defined by a communication protocol or standard, spans a specified frequency band 510 corresponding to a sub-channel and a specified time interval 512. In accordance with a 5G NR protocol, for example, each resource element 508 spans a specified frequency band 510 of 15 kHz and a specified time interval 512 of one-half millisecond.

In some implementations, a resource manager module, such as the resource manager module 134 of the base station 104, may allocate resources of resource block 502 for use during wireless communication between the user device 102 and the base station 104. For example, as part of Physical Downlink Control Channel (PDCCH) communications, the resource manager module 134 may assign resources comprised of resource elements spanning sub-channels 514 and sub-channel 516 as part of the PDCCH communications. The sub-channels 514 may communicate a portion of data communicated via the PDCCH communications, such as that comprising the PDCCH layer 206 of FIG. 2, while sub-channel 516 communicates another portion of the data, such as the comprising the PDCCH layer 208 of FIG. 2. One or more beams may carry respective portions of the data.

Techniques for User Device Beamforming

Figure 6:
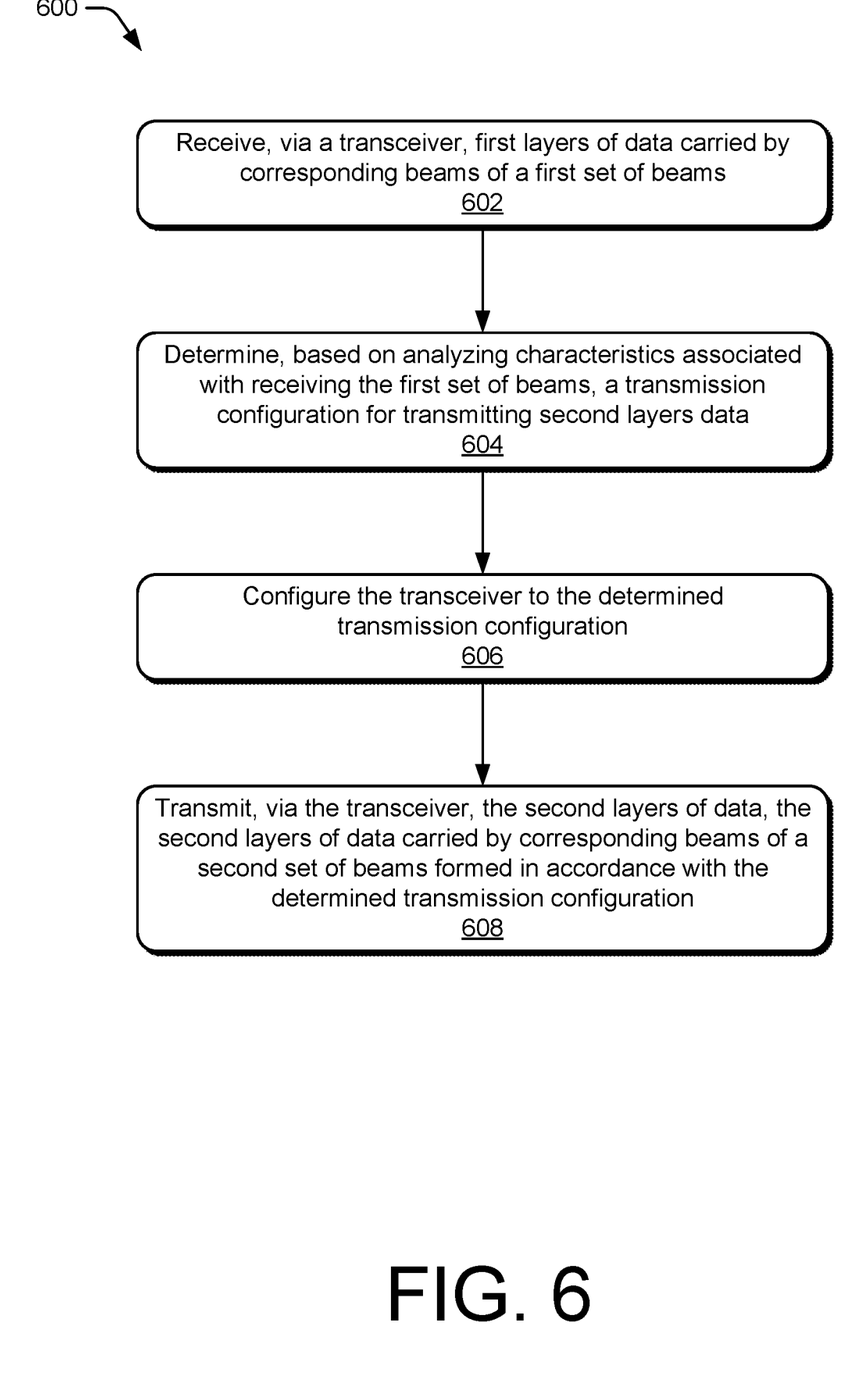
FIG. 6 illustrates an example method performed by a user device in support of user device beamforming.

FIG. 6 illustrates an example method 600 performed by a user device in support of user device beamforming. In some aspects, the user device may implement method 600 to form a beam along a beam direction or increase a strength of a signal that may be a part of the beam.

At operation 602, the user device receives, via a transceiver, first layers of data carried by corresponding beams of a first set of beams. For example, the user device can be the user device 102 of FIG. 1 and receive layers of Physical Downlink Control Channel data through a transceiver having an antenna array, such as the transceiver 106 having the MIMO antenna array 110. Example layers of data include the PDCCH layer 206 and the PDCCH layer 208 of FIG. 2. Example beams include the beam 202 corresponding to and carrying the PDCCH layer 206 and the beam 204 corresponding to and carrying the PDCCH layer 208 of FIG. 2.

At operation 604, the user device determines a transmission configuration for transmitting second layers of data based on analyzing characteristics associated with receiving the first set of beams. A processor may execute code of a beam analysis module, such as the processor 122 and the beam analysis module 126 of FIG. 1. An algorithm contained in the beam analysis module may analyze characteristics associated with receiving of the first set of beams as part of determining the transmission configuration for the transceiver. Such characteristics may include signal strengths or frequencies of the first set of beams as sensed by beam sensing circuitry (e.g., the beam sensing circuitry of FIG. 1.), times of receipt for each of the first layers of data corresponding to the first set of beams, identities of antennas receiving each of the first layers of data corresponding to the first set of beams, or the like. In certain instances, analyzing the beams may include verifying that a beam is carrying data that is associated with Physical Downlink Control Channel (PDCCH) communications, such as data associated with an uplink grant or Downlink Control Information (DCI), prior to analyzing characteristics of the first set of beams.

Also, as part of determining the transmission configuration, the user device may evaluate beam directions available for transmitting. Such an evaluation may evaluate factors such as Global Positioning System (GPS) coordinates of the user device, beams from other devices communicating in a region along a beam direction, a time of day, stored or retrieved data indicating a population density of a region along a beam direction, or the like.

At operation 606, the user device configures the transceiver to the determined transceiver configuration. A processor may execute code of a transceiver configuration module, such as the transceiver configuration module 128 of FIG. 1. The transceiver configuration may weight or assign signals to antennas of an antenna array such that constructive or destructive combinations of signals occur during transmission of a second layer of data from the user device and form a second set of beams.

At operation 608, the user device transmits, via the transceiver, the second layers of data. Corresponding beams of a second set of beams carry the second layers of data and are formed in accordance with the determined transmission configuration. For example, the user device may transmit multiple layers of PUSCH data through the transceiver in accordance with the determined transmission configuration. Example layers of data include the PUSCH layer 210 and the PUSCH layer 212 of FIG. 2. Example beams include the beam 214 corresponding to and carrying the PUSCH layer 210 and the beam 216 corresponding to and carrying the PUSCH layer 212, both of which the transceiver forms in accordance with the transmission configuration determined and configured as part of operations 604 and 606.

The second layers of data may include complementary portions of data or duplicate data. Examples of data types of the second layers of data include Radio Resource Control (RRC) data, Uplink Control Information (UCI) data, or data from an application executing on the device.

Analysis of the first set of beams and configuring the transceiver to form the second set of beams may combine multiple elements of the aforementioned examples in any order or combination. Additionally, the techniques may be applicable to beams carrying data types that are not associated with PDCCH or PUSCH communications.

Furthermore, any of a variety of events may initiate method 600. For example, initiation of method 600 may be in response to a command received from another device (a user device or a base station), a detected change in a strength of a signal received by the user device, a detected change in a location of the user device, an expiration of a time period, or the like. Furthermore, and in such instances, the first layers of data and the second layers of data may be other than the example PDCCH and PUSCH layers of data.

Figure 7:
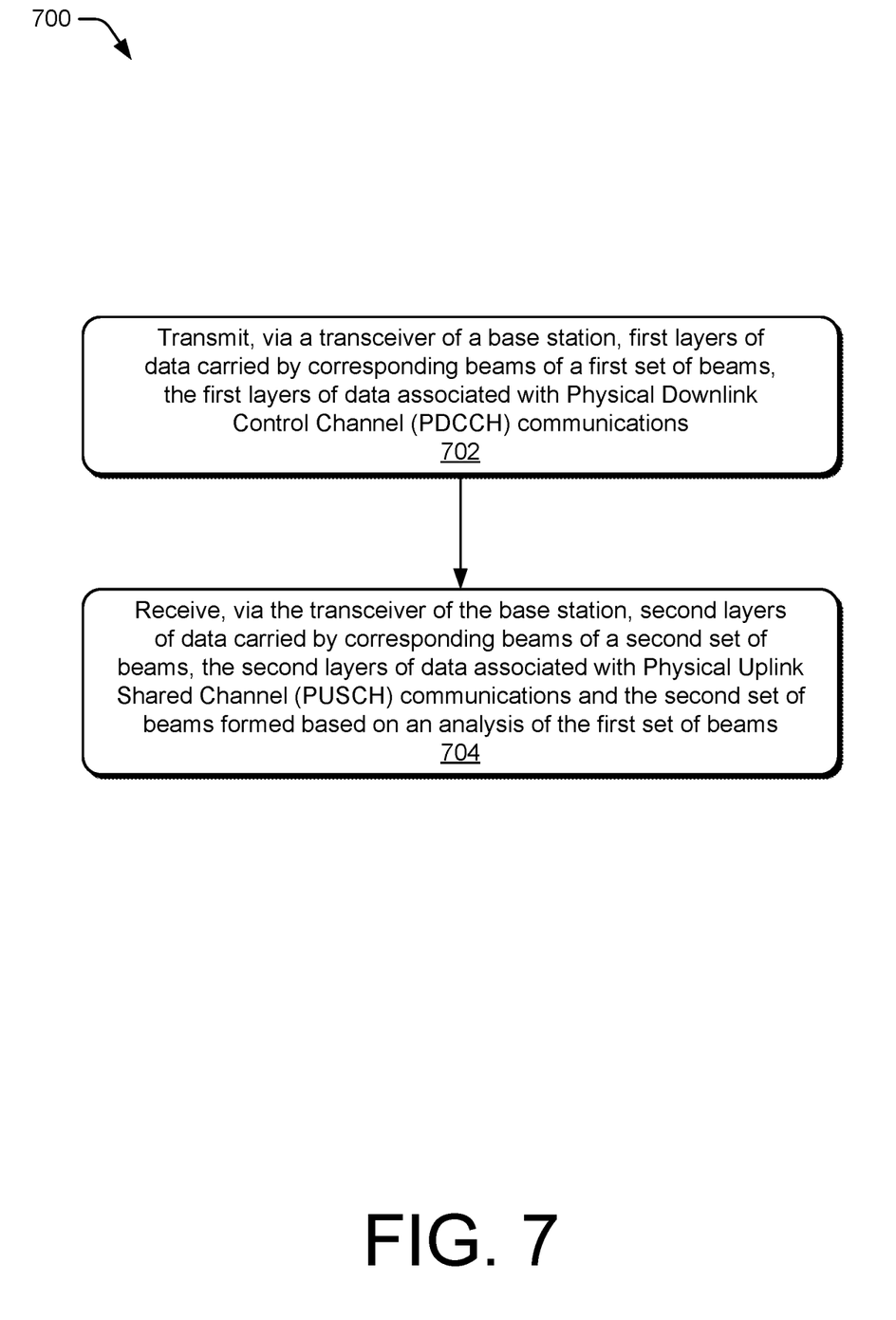
FIG. 7 illustrates an example method performed by a base station in support of user device beamforming.

FIG. 7 illustrates an example method 700 performed by a base station in support of user device beamforming. The base station may be a base station such as the base station 104 of FIG. 1. In some aspects, the base station may implement method 700 as part of communicating with a user device such as the user device 102 of FIG. 1.

At operation 702, the base station transmits, via a transceiver of the base station, first layers of data carried by corresponding beams of a first set of beams. The first layers of data are associated with Physical Downlink Control Channel communications and are transmitted via a transceiver of the base station, such as the transceiver 108 having the MIMO antenna array 112 of FIG. 1. Example layers of data include the PDCCH layer 206 and the PDCCH layer 208 of FIG. 2. Example beams include the beam 202 corresponding to and carrying the PDCCH layer 206 and the beam 204 corresponding to and carrying the PDCCH layer 208.

The first layers of data may include complementary portions of data or duplicate data. Examples of data types that the first set of beams may carry include data associated with an Uplink (UL) grant or data associated with Downlink Control Information (DCI).

The base station may, as part of transmitting the first layers of data, allocate resources of a resource block, such as the resource block 502 of FIG. 5, to a user device, such as the user device 102 of FIG. 1. In turn, the user device may use the allocated resources when transmitting data as part of uplink communications to the base station. A resource manager that is part of the base station, such as the resource manager module 134 of FIG. 1, may manage allocation.

A master cell controller remote from the base station (not illustrated) may communicate a transmission configuration to the transceiver of the base station where the master cell controller bases the transmission configuration on analyzing beams emitted from other user devices communicating within a cell supported by the base station. Alternatively, a beam analysis module local to the base station can determine a transmission configuration for the transceiver of the base station.

At operation 704, the base station receives, via the transceiver of the base station, second layers of data carried by corresponding beams of a second set of beams. The second layers of data are associated Physical Uplink Shared Channel (PUSCH) communications and are received via the transceiver of the base station. Another transceiver, such as the transceiver 106 of FIG. 1, may form the second set of beams based on an analysis of the first set of beams.

Example second layers of data include PUSCH layer 210 and PUSCH layer 212 of FIG. 2. Furthermore, example data types of the second layers of data include Radio Resource Control (RRC) data, Uplink Control Information (UCI) data, or data from an application executing on the user device.

Although this document describes apparatuses and techniques for user device beamforming in language specific to features or methods, a reader is to understand that the features or methods do not necessarily limit the subject of the appended claims. Rather, this document discloses the specific features and methods as example ways in which a user device can implement beamforming

What is claimed is:

1. A method of beamforming performed by a user device, the method comprising:

receiving, from a base station and using a transceiver of the user device, first layers of first data carried by a plurality of downlink beams, the receiving the first layers of first data including receiving a Physical Uplink Shared Channel (PUSCH) uplink grant transmitted over a Physical Downlink Control Channel (PDCCH) and indicating the same number of uplink beams as the plurality of downlink beams;

identifying characteristics associated with the receiving the first layers of first data;

establishing, based on the characteristics, a transmission configuration for transmitting second layers of second data using the transceiver, the establishing the transmission configuration comprising:

setting a quantity of uplink beams to equal a quantity of the downlink beams; and setting a direction for the uplink beams that is different and non-reciprocal to that of the downlink beams;

configuring the transceiver to the transmission configuration; and transmitting, to the base station and using the transceiver of the user device, the second layers of second data according to the transmission configuration.

2. The method of claim 1, wherein the identifying the characteristics further comprises determining one or more of: (i) signal strengths or signal frequencies associated with each of the downlink beams; (ii) times of receipt of each of the first layers of first data corresponding to the downlink beams; or (iii) identities of antennas that receive each of the first layers of first data corresponding to the downlink beams, the antennas being part of a Multiple-Input and Multiple-Output (MIMO) antenna array of the user device.

3. The method of claim 1, wherein the transmitting the second layers of second data includes transmitting the second layers of second data as part of Physical Uplink Shared Channel (PUSCH) communications.

4. The method of claim 1, wherein the second layers of second data include Radio Resource Control (RRC) information or Uplink Control Information (UCI).

5. The method of claim 1, wherein the second layers of second data include data from an application executing on the user device.

6. The method as recited in claim 1, wherein the direction for the uplink beams is a pre-defined direction.

7. The method as recited in claim 1, wherein the direction for the uplink beams is one of a number of available beam directions that can be adjusted to in real time by the user device.

8. The method as recited in claim 1, further comprising:
evaluating a plurality of potential directions for the uplink beams,
wherein the setting the direction for the uplink beams is based on the evaluation of the plurality of potential directions for the uplink beams.

9. The method as recited in claim 1, wherein the establishing is based further on one or more of: frequencies of the downlink beams, traffic patterns of a wireless network, volumes of data being communicated within the wireless network, a location of the user device relative to the base station, a time of day, a reliability of the base station, or an uptime of the base station.

10. The method of claim 1, further comprising:
receiving, from the base station, network characteristics that include one or more of: traffic patterns of a wireless network, volumes of data being communicated within the wireless network, a reliability of the base station, or an uptime of the base station; and
wherein the establishing the transmission configuration further comprises:
establishing the transmission configuration, based on the characteristics, the network characteristics, or both.

11. The method of claim 1, wherein the transmitting the second layers of the second data comprises transmitting the second layers of the second data using the uplink beams.

12. A method of transmitting and receiving data, the method performed by a base station and comprising:
forming first layers of first data comprising Physical Downlink Control Channel (PDCCH) communications;
transmitting, to a user device and using a transceiver of the base station, the first layers of first data using a plurality of downlink beams having a certain quantity of downlink beams;
communicating, to the user device, one or more of: traffic patterns of a wireless network, volumes of data being communicated within the wireless network, a reliability of the base station, or an uptime of the base station; and
receiving, using the transceiver of the base station, second layers of second data comprising Physical Uplink Shared Channel (PUSCH) communications, the second layers of second data carried by uplink beams that:
have a certain quantity of uplink beams that is equal to the certain quantity of downlink beams; and
are received from a different and non-reciprocal direction than that of the downlink beams.

13. The method as recited in claim 12, wherein at least one of the first layers of first data grants the user device access to the Physical Uplink Shared Channel (PUSCH) communications.

14. The method as recited in claim 12, wherein the downlink beams carry Downlink Control Information (DCI).

15. The method as recited in claim 12, wherein the uplink beams carry Uplink Control Information (UCI).

16. The method as recited in claim 11, further comprising:
receiving a plurality of potential uplink beams from the user device; and
communicating feedback regarding the plurality of potential uplink beams to the user device effective to enable the user device to determine the different and non-reciprocal direction for the uplink beams.

17. A user device comprising:
a processor;
a transceiver; and
a computer-readable storage media (CRM) having stored thereon instructions that, responsive to execution by the processor, direct the user device to perform operations comprising:
receiving, from a base station and using the transceiver, first layers of first data carried by a plurality of downlink beams, the receiving the first layers of first data including receiving a Physical Uplink Shared Channel (PUSCH) uplink grant transmitted over a Physical Downlink Control Channel (PDCCH) and indicating the same number of uplink beams as the plurality of downlink beams;
identifying, using a beam analysis module of the CRM, characteristics associated with the receiving the first layers of first data;
establishing, based on the characteristics, a transmission configuration for transmitting second layers of second data using the transceiver, the establishing the transmission configuration comprising:
setting a quantity of uplink beams to equal a quantity of the downlink beams; and setting a direction for the uplink beams that is different and non-reciprocal to that of the downlink beams;
configuring, using a transceiver configuration module of the CRM, the transceiver to the transmission configuration; and
transmitting, to the base station and using the transceiver, the second layers of second data according to the transmission configuration.

18. The user device as recited in claim 17, wherein the transceiver includes a Multiple-Input and Multiple-Output (MIMO) antenna array, the MIMO antenna array configured to:
perform as an adaptive array; and
form, in real time, the uplink beams along one of a number of available beam directions.

19. The user device as recited in claim 17, wherein the identifying the characteristics further comprises determining, by the beam analysis module one or more of: (i) signal strengths or signal frequencies associated with each of the downlink beams; (ii) times of receipt of each of the first layers of first data corresponding to the downlink beams; or (iii) identities of antennas of the transceiver that receive each of the first layers of first data corresponding to the downlink beams.

20. The user device as recited in claim 17, the instructions that, responsive to execution by the processor, direct the user device to perform operations comprising:
receiving, from the base station, network characteristics that include one or more of: traffic patterns of a wireless network, volumes of data being communicated within the wireless network, a reliability of the base station, or an uptime of the base station; and
wherein the establishing the transmission configuration further comprises:
establishing the transmission configuration, based on the characteristics, the network characteristics, or both.

21. The user device as recited in claim 17, wherein the transmitting the second layers of the second data comprises transmitting the second layers of the second data using the uplink beams.

\* \* \* \* \*